United States Patent
Chu et al.

(10) Patent No.: US 10,257,859 B1
(45) Date of Patent: Apr. 9, 2019

(54) METHOD AND APPARATUS FOR CLEAR CHANNEL ASSESSMENT

(71) Applicant: Marvell International Ltd., Hamilton (BM)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 17 days.

(21) Appl. No.: 15/598,107

(22) Filed: May 17, 2017

Related U.S. Application Data

(60) Provisional application No. 62/337,855, filed on May 17, 2016.

(51) Int. Cl.
*H04W 74/08* (2009.01)
*H04B 17/318* (2015.01)

(52) U.S. Cl.
CPC ...... *H04W 74/0816* (2013.01); *H04B 17/318* (2015.01)

(58) Field of Classification Search
CPC .......................... H04W 74/0816; H04B 17/318
See application file for complete search history.

(56) References Cited

U.S. PATENT DOCUMENTS

| | | | | |
|---|---|---|---|---|
| 2013/0188506 A1* | 7/2013 | Cheong | ............... | H04W 72/085 370/252 |
| 2016/0029412 A1* | 1/2016 | Naeini | ............. | H04W 74/0808 370/329 |
| 2016/0087826 A1* | 3/2016 | Huang | ............... | H04L 27/0006 375/316 |
| 2016/0338086 A1* | 11/2016 | Zhou | ................. | H04W 72/1252 |
| 2016/0353329 A1* | 12/2016 | Kakani | ................. | H04W 24/08 |

* cited by examiner

*Primary Examiner* — Mohammad S Anwar

(57) ABSTRACT

Aspects of the disclosure provide an apparatus for wireless communication. The apparatus includes a transceiver and a processing circuit. The transceiver is configured to receive signals and transmit signals in one or more channels. The processing circuit is configured to detect that received signals in a channel carry a data unit, determine that the data unit belongs to an overlapping basic service set (OBSS) that overlaps with a basic service set (BSS) that the apparatus belongs to without information in a preamble of the data unit, select a clear channel assessment threshold that is dynamically adjusted for spatial re-use when the data unit is determined to belong to the OBSS, and compare a signal strength of the data unit with the selected clear channel assessment threshold to determine a busy/idle status of the channel.

15 Claims, 8 Drawing Sheets

METHOD AND APPARATUS FOR CLEAR CHANNEL ASSESSMENT

INCORPORATION BY REFERENCE

This present disclosure claims the benefit of U.S. Provisional Application No. 62/337,855, "SECONDARY CHANNEL CCA, MID PACKET DETECTION AND DYNAMIC CCA" filed on May 17, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall and the like to link two or more devices using wireless connections within a limited area to a network. The WLAN allows users to move around within the limited area and still be connected to the network. In addition, the WLAN can be configured to provide connections to other network, such as, a wide area network, Internet and the like. Generally, WLANs are implemented based on standards, such as IEEE 802.11 standards, and the like.

SUMMARY

Aspects of the disclosure provide an apparatus for wireless communication. The apparatus includes a transceiver and a processing circuit. The transceiver is configured to receive signals and transmit signals in one or more channels. The processing circuit is configured to detect that received signals in a channel carrying a data unit, determine that the data unit belongs to an overlapping basic service set (OBSS) that overlaps with a basic service set (BSS) that the apparatus belongs to without information in a preamble of the data unit, select a clear channel assessment threshold that is dynamically adjusted for spatial re-use when the data unit is determined to belong to the OBSS, and compare a signal strength of the data unit with the selected clear channel assessment threshold to determine a busy/idle status of the channel.

In an embodiment, the processing circuit is configured to determine that the data unit belongs to the OBSS when the channel is a secondary channel. In another embodiment, the processing circuit is configured to determine that the data unit belongs to the OBSS when the data unit violates timing requirement in the channel.

In an embodiment, the processing circuit is configured to select the clear channel assessment threshold having a predetermined fixed value when the determination that the data unit belongs to OBSS is not able to make.

In an example, the clear channel assessment threshold is adjusted between a maximum value and a minimum value with a linear relationship to a transmit power of a transmitting circuit. Further, in an embodiment, the clear channel assessment threshold is a function of a bandwidth of the channel.

Aspects of the disclosure provide a method of wireless communication. The method includes detecting, by a processing circuit in a device, received signals carrying a data unit, determining that the data unit belongs to an overlapping basic service set (OBSS) that overlaps with a basic service set (BSS) that the device belongs to without information in a preamble of the data unit, selecting a clear channel assessment threshold that is dynamically adjusted for spatial re-use when the data unit is determined to belong to the OBSS, and comparing a signal strength of the data unit with the selected clear channel assessment threshold to determine a busy/idle status of the channel.

Aspects of the disclosure provide a non-transitory computer readable medium storing program instructions for causing a processor to execute operations for wireless communication. The operations include detecting received signals carrying a data unit, determining that the data unit belongs to an overlapping basic service set (OBSS) that overlaps with a basic service set (BSS) that the device belongs to without information in a preamble of the data unit, selecting a clear channel assessment threshold that is dynamically adjusted for spatial re-use when the data unit is determined to belong to the OBSS, and comparing a signal strength of the data unit with the selected clear channel assessment threshold to determine a busy/idle status of the channel.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
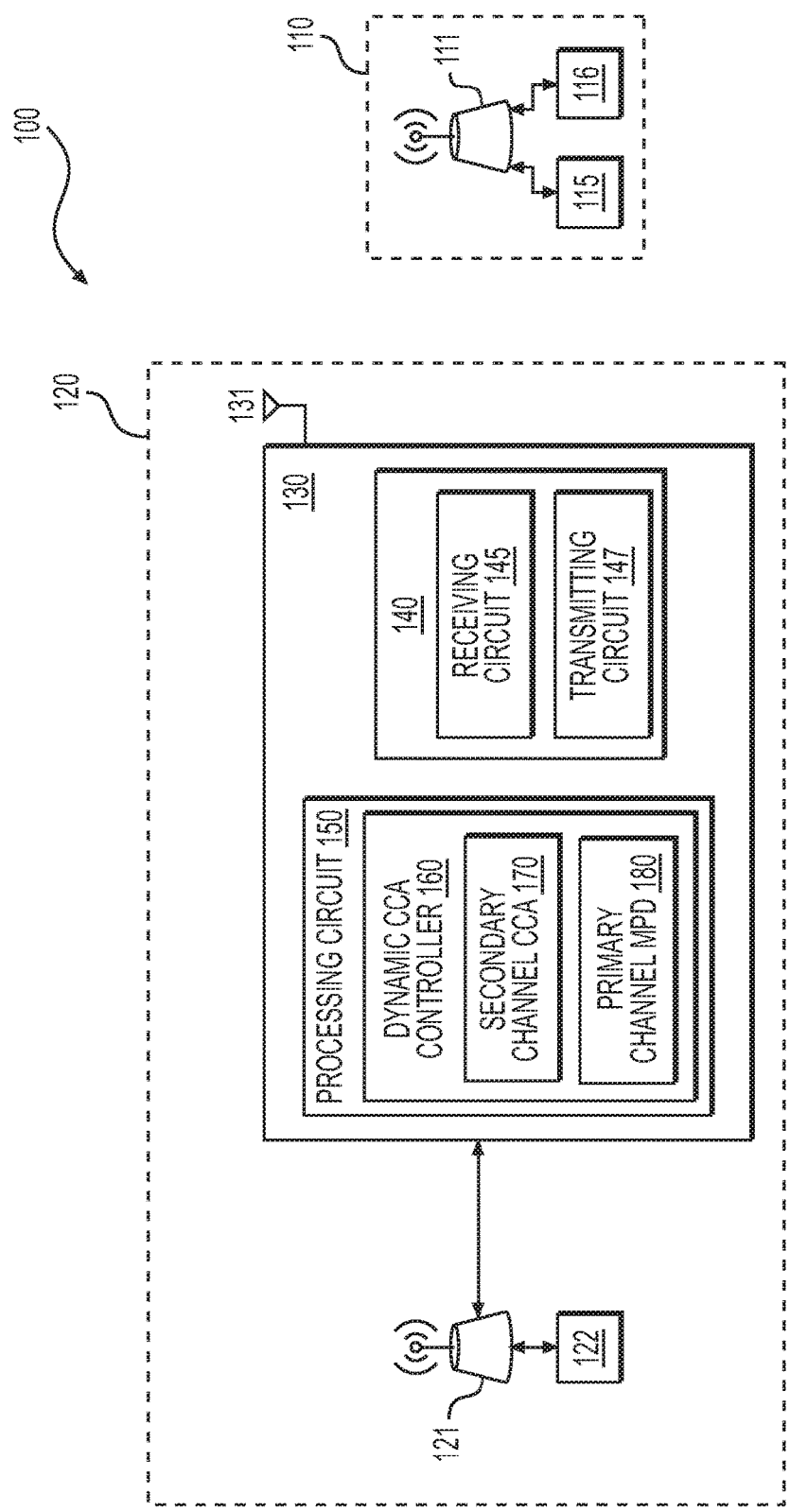
FIG. 1 shows a diagram of a network 100 according to an embodiment of the disclosure.

FIG. 1 shows a diagram of a network 100 according to an embodiment of the disclosure. The network 100 includes a plurality of service sets, such as a first basic service set (BSS) 110, a second BSS 120, and the like. Each service set includes a plurality of devices in wireless communication. For example, the first BSS 110 includes devices 111, 115, 116 and the like in wireless communication, and the second BSS 120 includes devices 121, 122, 130 and the like in wireless communication. In the network 100, at least one device, such as the device 130, is configured to detect wireless signals carrying a data unit (e.g. a packet, a frame, and the like) that belongs to an overlapping service set (OBSS), and use a threshold that is dynamically adjusted for spatial re-use to perform clear channel assessment when the packet belongs to the OBSS.

The network 100 includes interconnections that are implemented using any suitable network technology, such wired, wireless, a local area network (LAN), a wireless LAN (WLAN), a fiber optical network, a wide area network (WAN), a peer-to-peer network, the Internet, and the like. In an example, the first BSS 110 is implemented using WLAN technology to interconnect the devices 111, 115, 116 and the like; the second BSS 120 is implemented using WLAN technology to interconnect the devices 121, 122, 130 and the like; and the network 100 includes other suitable interconnections (not shown), such as a LAN, a fiber optical network, and the like to provide connections for the first BSS 110 and the second BSS 120 to be connected to for example Internet. It is noted that, in an example, the first BSS 110 and the second BSS 120 belong to a same WLAN; and in another example, the first BSS 110 and the second BSS 120 belong to different WLANs.

According to an aspect of the disclosure, the second BSS 120 and the first BSS 110 are overlapping basic service sets. In an embodiment, the first BSS 110 and the second BSS 120 are infrastructure type basic service sets. The first BSS 110 includes an access point (AP) device 111, and station (STA) devices 115 and 116. The STA devices 115 and 116 communicate through the AP device 111, and the AP device 111 includes network hardware and software configured to serve as a bridge to allow the STA devices 115 and 116 to connect to other part of the network 100. Similarly, the second BSS 120 includes an AP device 121, and STA devices 122 and 130. The STA devices 122 and 130 communicate though the AP device 121, and the AP device 121 includes network hardware and software configured to serve as a bridge to allow the STA devices 122 and 130 to connect to other part of the network 100. In the embodiment, the AP device 111 and the STA device 115 communicate using a first frequency channel, and the AP device 111 is configured to cover a first service area. The AP 121 and the STA device 130 communicate using a second frequency channel, and the AP device 121 is configured to cover a second service area. In the embodiment, the second frequency channel overlaps the first frequency channel, and the second service area overlaps the first service area, thus the second BSS 120 and the first BSS 110 are overlapping basic service sets.

Each of the STA devices in the network 100, such as the STA devices 115, 116, 122 and 130, can be any suitable device, such as a desktop computer, a laptop computer, a tablet computer, a smart phone, a personal digital assistant (PDA), a smart watch, a smart camera, a smart TV, a smart voice recorder, a wearable device, and the like. According to an aspect of the disclosure, the STA devices in the network 100 are implemented using the same version or different versions of a wireless standard, such as various IEEE 802.11 standards.

According to an aspect of the disclosure, the network 100 is under a scenario of a high density of STA devices and/or AP devices, and is configured to manage interference between neighboring overlapping basic service sets and increase spatial and spectral frequency re-use. In an embodiment, one or more devices in the network 100, such as the STA device 130, is configured to use a specific clear channel assessment threshold that is dynamically adjusted to manage interference from OBSS. For example, when the density of STA devices and/or AP devices is relatively high, the clear channel assessment threshold is adjusted high to encourage spatial and spectral frequency re-use; and when the density of STA devices and/or AP devices becomes low, the clear channel assessment threshold is adjusted low.

In an example, when the STA device 130 detects signals carrying a data unit, the STA device 130 uses any suitable technique to determine whether the data unit is from the OBSS. When the data unit is from the OBSS, the STA device 130 selects a clear channel assessment threshold that is dynamically adjusted, and uses the clear channel assessment threshold to determine a busy/idle status of a channel. For example, a signal strength of the data unit is compared with the clear channel assessment threshold. When the signal strength is lower than the clear channel assessment threshold, the channel is considered as idle in an example, and when the signal strength is higher than the clear channel assessment threshold, the channel is considered as busy in the example. When the clear channel assessment threshold is high, the channel has a larger chance to be considered as idle, and can be used by the STA device 130 to transmit information.

Generally, a data unit includes certain information, such as BSS color information, and like in a preamble of the data unit that is indicative of the BSS that the data unit belongs to. However, under various situations, the preamble is not available. In an embodiment, the STA device 130 is configured to determine whether the data unit belongs to the OBSS without information in the preamble of the data unit. Then the STA device 130 selects a threshold that is dynamically adjusted to perform clear channel assessment when the data unit belongs to the OBSS.

Specifically, in the FIG. 1 example, the STA device 130 includes a transceiver circuit 140 and a processing circuit 150 coupled together as shown in FIG. 1. In the example, the transceiver circuit 140 includes a receiving circuit 145 and a transmitting circuit 147 that are both coupled to an antenna 131, and the processing circuit 150 includes a dynamic CCA controller 160.

It is noted that in an example, the STA device 130 can include multiple antennas, and the receiving circuit 145 and the transmitting circuit 147 can be coupled to separate antennas.

The transceiver circuit 140 is configured to receive and transmit wireless signals. For example, the receiving circuit 145 is configured to generate electrical signals in response to captured electromagnetic waves by the antenna 131, process the electrical signals to extract digital streams from the electrical signals. In an example, the transmitting circuit 147 is configured to receive digital streams, such as management frames, data frames, and the like from for example the processing circuit 150, generate radio frequency (RF) signals to carry the digital streams, and emit electromagnetic waves in the air via the antenna 131 to transmit wireless signals that carry the digital streams.

In an embodiment, the receiving circuit 145 is configured to receive wireless signals from various sources. In an example, the receiving circuit 145 is configured to generate electrical signals in response to wireless signals emitted by devices in the second BSS 120 and other BSS. In an example, the first BSS 110 is an overlapping BSS (OBSS) for the second BSS 120. Then, the electrical signals generated by the receiving circuit 145 may correspond to wireless signals emitted by devices in the second BSS 110, such as the AP 121, the STA device 122 and the like and may correspond to wireless signals emitted by devices in the first BSS 110, such as the AP 111, the STA devices 115 and 116. In the example, the receiving circuit 145 processes the electrical signals. For example, the receiving circuit 145 extracts digital streams sent by devices in the OBSS. The digital streams are provided to the processing circuit 150 for further processing.

It is noted that receiving circuit 145 can extract other suitable information of the received wireless signals, such as signal strengths of the wireless signals, and the like. The extracted information is provided to the processing circuit 150 for further processing.

According to an aspect of the disclosure, the transmitting circuit 147 also receives control signals, such as a transmit power control signal and the like, from the processing circuit 150. In an example, the transmitting circuit 147 is configured to emit wireless signals with a power controlled according to the transmit power control signal.

The processing circuit 150 is configured to perform various processing. The processing circuit 150 can be implemented using any suitable technology. In an embodiment, the processing circuit 150 is implemented using pure circuits.

In another embodiment, the processing circuit 150 is implemented using a processor (not shown) and memory circuit (not shown). The memory circuit is configured to store data and software instructions. The processor is configured to execute software instructions to process data. In an example, the dynamic CCA controller 160 is implemented as a processor executing software instructions. For example, the memory circuit stores software instructions, and the processor executes the software instructions to perform operations for dynamic CCA control.

According to an aspect of the disclosure, the processing circuit 150 uses a plurality of clear channel assessment thresholds at different times for various clear channel assessment situations. Some of the clear channel assessment thresholds have fixed values that are predetermined, for example, specified in an IEEE 802.11 standard. Some of the clear channel assessment thresholds are dynamically adjusted, such as clear channel assessment thresholds for data units from OBSS. In an embodiment, the processing circuit 150 is configured to determine that a data unit belongs to an OBSS without information in a preamble of the data unit. In an example, the preamble of the data unit is not corrected decoded. In another example, the detection of the data unit starts in the middle of the data unit, and misses the preamble portion of the data unit. The processing circuit 150 then determines whether the data unit belongs to an OBSS based on other information. In an example, when the data unit is detected from a secondary channel of the STA device 130, the processing circuit 150 determines that the data unit belongs to an OBSS. In another example, when the timings of the data unit does not satisfy timing requirement in the primary channel of the second BSS 120, the processing circuit 150 determines that the data unit belongs to an OBSS. In an example, when the processing circuit 150 is not able to make the determination, the processing circuit 150 assumes that the data unit belongs to intra-BSS.

In an embodiment, when the data unit belongs to an OBSS, the dynamic CCA controller 160 determines proper clear channel threshold to determine the busy/idle status of a channel. In the FIG. 1 example, the dynamic CCA controller 160 includes a secondary channel CCA module 170, and a primary channel mid packet detection (MPD) module 180. In the example that the data unit is detected from a secondary channel, the secondary channel CCA module 170 is used to select the proper clear channel assessment threshold. In the example that the timings of the data unit does not satisfy timing requirement in the primary channel of the second BSS 120, the primary channel MPD module 180 is used to select the proper clear channel assessment threshold.

Figure 2:
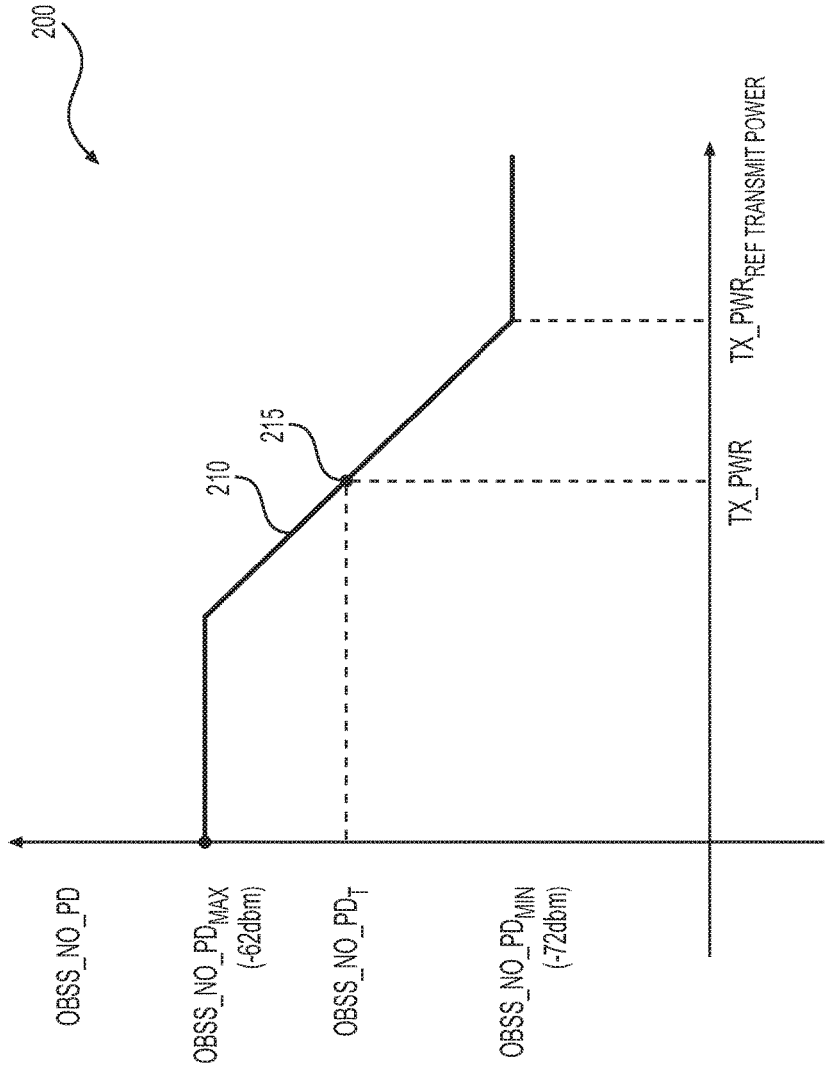
FIG. 2 shows a plot 200 for dynamic spatial re-use parameter adjustment according to an embodiment of the disclosure.

In an embodiment, the adjustment of the specific clear channel assessment threshold in the STA device 130 is based on a relationship with a transmit power used in the STA device 130. In an example, the relationship is defined according to a proportional rule for the specific clear channel assessment threshold and the transmit power level. In the example, an increase in the specific clear channel assessment threshold is proportional to a decrease in the transmit power level. In an example, the relationship is defined using three values, such as a minimum value of the specific clear channel assessment threshold, a maximum value of the specific clear channel assessment threshold, and a reference transmit power. An example of a relationship of a specific clear channel assessment threshold and transmit power is shown in FIG. 2 and will be described with reference to FIG. 2.

In an example, the secondary channel CCA module 170 is configured to select the proper clear channel assessment threshold based on a first relationship between the clear channel assessment threshold and a transmit power, and the primary channel MPD module 180 is configured to select the proper clear channel assessment threshold based on a second relationship between the clear channel assessment threshold and a transmit power. In an example, the first relationship and the second relationship are different. In another example, the first relationship and the second relation are the same.

According to an aspect of the disclosure, in an embodiment, the processing circuit 150 determines wireless environment surrounding the STA 130 itself. In an example, the processing circuit 150 determines transmit power requirement by listening to signals from the AP 121. For example, the processing circuit 150 tracks received signal power ($RSP_{AP121-STA130}$) of wireless signals emitted by the AP 121, and other devices. For example, when the received signal power of wireless signals emitted by the AP 121 increases, the processing circuit 150 determines that the STA 130 moves closer to the AP 121; and when the received signal power of wireless signals emitted by the AP 121 decreases, the processing circuit 150 determines that the STA 130 moves away from the AP 121. In another example, the processing circuit 150 has knowledge of the AP device 121, such as a transmit power level (TX_PWR_121) of the AP 121, the processing circuit 150 determines a path loss ($LOSS_{AP121-STA130}$) between the AP 121 and the STA 130.

The processing circuit 150 also determines spatial re-use information associated with devices in other BSSs, such as the STA device 115 and the like. In an embodiment, the processing circuit 150 detects on-going wireless communication in other BSSs, such as the first BSS 110, and the like. For example, the processing circuit 150 receives a data stream extracted from wireless signals that are emitted by the STA 115 in the first BSS 110. The data stream includes information about the STA 115 and about the first BSS 110. For example, the data stream includes flags that are indicative of the first BSS 110, includes transmit power information ($TX\_PWR_{STA115}$) of the STA 115, and includes received signal power ($RSP_{AP111-STA115}$) by the STA 115 of wireless signals emitted from the AP 111. It is noted that the information of the received signal power by the STA 115 of wireless signals emitted from the AP 111 can be included in other form, such as received signal strength indicator (RSSI), and the like. The processing circuit 150 determines that the wireless signals that carry the data stream are emitted from for example, the first BSS 110. Further, the processing circuit 150 compares received signal power ($RSP_{STA115-STA130}$) of the wireless signals and transmit power information ($TX\_PWR_{STA115}$) to determine a path loss ($LOSS_{STA115-STA130}$) from the STA device 115 to the STA 130.

Further, in an embodiment, the dynamic CCA controller 160 determines a range of transmit power level (TX_PWR130) that would not cause interference to the on-going wireless communication in other BSSs. For example, the dynamic CCA controller 160 determines a range of transmit power level to satisfy Eq. 1 in order not to cause interference to the on-going wireless communication at STA 115:

$$TX\_PWR130 - LOSS_{STA115-STA130} < RSP_{AP111-STA115} \qquad \text{Eq. 1}$$

In addition, the processing circuit 150 has a knowledge of a minimum transmit power level (TX_PWR130$_{MIN}$) requirement (TX_PWR130>TX_PWR130$_{MIN}$) in order to communicate with the AP 121. In an embodiment, the processing circuit 150 suitably selects a transmit power level (TX_PWR130) that satisfies Eq. 1 and the minimum transmit power level requirement.

Further, according to an aspect of the disclosure, the dynamic CCA controller 160 selects a suitable relationship between a specific clear channel assessment threshold based on a situation for clear channel assessment, and determines the clear channel assessment threshold associated with the determined transmit power level (TX_PWR130) according to the relationship between the clear channel assessment threshold and the transmit power when a received data unit is OBSS. In an example, Then, the processing circuit 150 uses the clear channel assessment threshold to determine whether a channel is clear, and provides transmit power control signal to the transmitting circuit 147 based on the transmit power level. In an example, when the STA 130 receives wireless signals carrying data unit from the first BSS 110, the receiving circuit 145 generates electrical signals in response to the wireless signals, and extracts a data stream from the electrical signals. In addition, the receiving circuit 145 detects received signal power. The processing circuit 150 then processes the data stream. For example, the processing circuit 150 determines whether the received signals carrying a data unit, and detects whether the data unit is from an OBSS.

In an example, when the wireless signals are received from a secondary channel and are determined to carry a data unit, the secondary channel CCA module 170 selects the proper clear channel assessment threshold based on the first relationship between the clear channel assessment threshold and the transmit power. In another example, the wireless signals are received from the primary channel and are determined to carry a data unit. However, the data unit violates timing requirements in the primary channel. In an example, the data unit is determined as from an OBSS, then the primary channel MPD module 180 selects the proper clear channel assessment threshold based on the second relationship between the clear channel assessment threshold and the transmit power. In another example, the primary channel MPD module 180 selects the clear channel assessment threshold with a predetermined fixed value.

Then, the processing circuit 150 compares the received signal power to the selected clear channel assessment threshold. When the received signal power is lower than signal selected clear channel assessment threshold, the dynamic CCA controller 160 determines that the channel is clear, and thus the STA 130 can initiate transmission according to the transmit power level to transmit concurrently with ongoing wireless communication in one or more other service sets.

Specifically, in an example, when the STA 130 receives, from a wireless communication channel, a wireless signal carrying a data unit (e.g., protocol data unit PPDU) and before the data unit is extracted, the signal strength of the wireless signal is compared to a first threshold (e.g., CCA threshold) to trigger a clear channel assessment CCA. For example, when the signal strength is higher than the first threshold, the processing circuit 150 determines that the received wireless signals carry data unit, and there is a high possibility that concurrent transmission with the ongoing transmission from other devices can cause interference. Thus the processing circuit 150 sets the wireless communication channel to be busy and the CCA is triggered. In an example, the first threshold is relatively low, such as −82 dbm for 20 MHz bandwidth.

It noted that, in an example, the STA 130 includes a second threshold (e.g., ED threshold) to detect interference. The second threshold is set to be high so that there is a very low probability of false alarm of interference detection. For example, when the signal strength of the received wireless signal is higher than the second threshold, the processing circuit 150 determines that interference will happen when the STA 130 transmits concurrently with the ongoing transmission from other device. In an example, the processing circuit 150 sets the wireless communication channel to be busy, and there is no need for triggering CCA. In an example, the second threshold is relatively high, such as −62 dbm for 20 MHz bandwidth.

When the CCA is triggered, the processing circuit 150 determines whether the data unit belongs to OBSS. In an example, the processing circuit 150 is able to detect the preamble portion of the data unit to look for BSS color information. The BSS color information is indicative of which BSS the data unit comes from. For example, when the BSS color indicates that the data unit is transmitted from the first BSS 110, the processing circuit 150 determines that the wireless signal that carries the data unit is from the overlapping basic service set. In the example, the processing circuit 150 selects a third threshold (OBSS_PD) based on a third relationship between the clear channel assessment threshold and the transmit power. The third relationship is used when the preamble is detectable and is used to determine the data unit is from OBSS. In an example, the minimum value in the third relationship is −82 dbm, and the maximum value is the third relationship is −62 dbm. In an example, when the signal strength of the wireless signal is lower than the third threshold, the processing circuit 150 discards the data unit, resets the wireless communication channel to be idle, ignores the received wireless signal, and not to update the network allocation vector (NAV). In an example, the STA 130 can continue to backoff, and operate like the wireless signal that carries the data unit is never received.

In another example, the processing circuit 150 is not able to detect the preamble portion, but is able to determine that the data unit is from an OBSS due to timing violation, the processing circuit 150 selects a fourth threshold (PR_MID_PKD) based on the second relationship between the clear channel assessment threshold and the transmit power. In an example, when the signal strength of the wireless signal is lower than the fourth threshold, the processing circuit 150 discards the data unit, resets the wireless communication channel to be idle, ignores the received wireless signal, and not to update the network allocation vector (NAV).

In an example, the STA 130 can continue to backoff, and operate like the wireless signal that carries the data unit is never received. In an embodiment, when the processing circuit 150 cannot determine whether the data unit is from an OBSS or is from intra-BSS, the processing circuit 150 selects the fourth threshold (PR_MID_PKD) to have a predetermined fixed value, such as −72 dbm for 20 MHz bandwidth.

In another example, the processing circuit 150 is not able to detect the preamble portion, but is able to determine that the data unit is from an OBSS because the wireless signal is received from a secondary channel, the processing circuit 150 selects a fifth threshold (OBSS_NO_PD$_T$) based on the first relationship between the clear channel assessment threshold and the transmit power. In an example, when the signal strength of the wireless signal is lower than the fifth threshold, the secondary channel is considered idle. In an example, the processing circuit 150 uses resources in both the primary channel and the secondary channel to transmit information.

FIG. 2 shows a plot 200 for a relationship of a specific clear channel threshold OBSS_NO_PD with transmit power according to an embodiment of the disclosure. The X-axis represents the transmit power level, and the Y-axis represents the value for specific clear channel threshold OBSS_NO_PD. In an example, the specific clear channel threshold OBSS_NO_PD is used when the preamble information is not available.

The plot 200 shows a curve 210 represents a relationship, such as the first relationship in the FIG. 1 example, between the specific clear channel assessment threshold OBSS_NO_PD and the transmit power level. The relationship is constructed based on a maximum value (OBSS_NO_PD$_{MAX}$) of the specific clear channel assessment threshold, a minimum value (OBSS_NO_PD$_{MIN}$) of the specific clear channel assessment threshold, and a reference value of the transmit power level (TX_PWR$_{REF}$). Each point 215 on the curve 210 corresponds to an allowed maximum transmit power TX_PWR and the specific clear channel assessment threshold OBSS_NO_PD$_T$. The relationship of specific clear channel assessment threshold OBSS_NO_PD$_T$ and allowed maximum transmit power (TX_PWR) is represented using Eq. 2:

$$\text{OBSS\_NO\_PD}_T = \max[\text{OBSS\_NO\_PD}_{MIN}, \min(\text{OBSS\_NO\_PD}_{MAX}, \text{OBSS\_NO\_PD}_{MIN} + \text{TX\_PWR}_{REF} - \text{TXP})] \quad \text{Eq. 2}$$

In an example, the minimum value OBSS_NO_PD$_{MIN}$, the maximum value OBSS_NO_PD$_{MAX}$, the specific clear channel assessment threshold OBSS_NO_PD$_T$, the reference transmit power level TX_PWR$_{REF}$ and the transmit power TX_PWR are in the unit of dbm which is an abbreviation for the power ratio in decibels (dB) of the measured power referenced to one miliwatt (mW).

In an example, Eq. 2 is used for a channel of 20 MHz. For example, the OBSS_NO_PD$_{MIN}$ is the minimum value of the specific clear channel assessment threshold for a channel of 20 MHz bandwidth, the OBSS_NO_PD$_{MAX}$ is the maximum value of the specific clear channel assessment threshold for a channel of 20 MHz bandwidth, the OBSS_NO_PD$_T$ is the specific clear channel assessment threshold for a channel of 20 MHz bandwidth. Eq. 2 can be suitable modified to be used for channels of different bandwidth. In an example, specific clear channel assessment threshold for a channel of a bandwidth (BW) is represented using Eq. 3.

$$\text{OBSS\_NO\_PD(BW)} = \max[\text{OBSS\_NO\_PD}_{MIN}(\text{BW}), \min(\text{OBSS\_NO\_PD}_{MAX}(\text{BW}), \text{OBSS\_NO\_PD}_{MIN}(\text{BW}) + \text{TX\_PWR}_{REF} - \text{TX\_PWR})] \quad \text{Eq. 3}$$

where OBSS_NO_PD(BW) denotes the specific clear channel assessment threshold of a channel of BW bandwidth, OBSS_NO_PD$_{MIN}$(BW) denotes the minimum value of the specific clear channel assessment threshold for a channel of BW bandwidth, OBSS_NO_PD$_{MAX}$(BW) denotes the maximum value of the specific clear channel assessment threshold for a channel of BW bandwidth. OBSS_NO_PD$_{MIN}$(BW) and OBSS_NO_PD$_{MAX}$(BW) can be calculated according to Eq. 4 and Eq. 5:

$$\text{OBSS\_NO\_PD}_{MIN}(BW) = \text{OBSS\_NO\_PD}_{MIN} + 10 \times \log\left(\frac{BW}{20 \text{ MHz}}\right) \quad \text{Eq. 4}$$

$$\text{OBSS\_NO\_PD}_{MAX}(BW) = \text{OBSS\_NO\_PD}_{MAX} + 10 \times \log\left(\frac{BW}{20 \text{ MHz}}\right) \quad \text{Eq. 5}$$

It is noted that the plot 200 can be suitably modified for other relationship.

Figure 3:
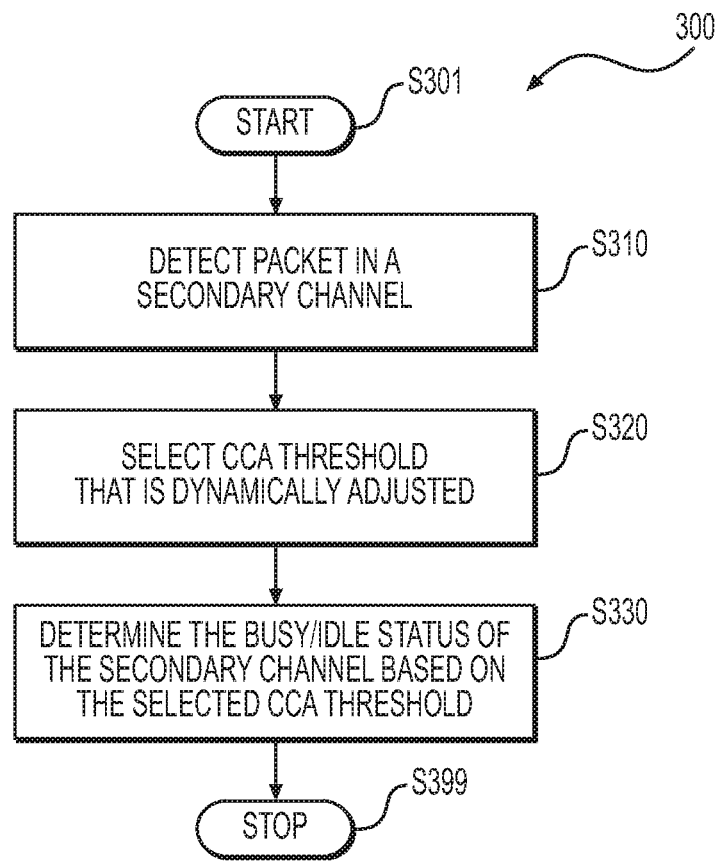
FIG. 3 shows a flow chart outlining a process 300 according to an embodiment of the disclosure.

FIG. 3 shows a flow chart outlining a process 300 according to an embodiment of the disclosure. In an example, the process 300 is executed by the processing circuit 150 in the STA device 130 in the FIG. 1 example. The process starts at S301 and proceeds to S310.

At S310, a packet (e.g., a data unit) is detected in a secondary channel. In an example, the STA device 130 performs a backoff procedure in the primary channel, and when the backoff counter counts down to zero and the primary channel is still idle, the STA device 130 detects whether a secondary channel is idle in order to seek opportunities for transmission with wider bandwidth. The STA device 130 monitors the secondary channel in a PIFS time duration. In an example, when the signal strength is higher than the first threshold, the STA device 130 determines that the wireless signal in the secondary channel carrying a packet, and the packet belongs to OBSS.

At S320, a clear channel assessment threshold that is dynamically adjusted is selected. In an example, the secondary channel CCA module 170 selects the proper clear channel assessment threshold based on the first relationship between the clear channel assessment threshold and the transmit power.

At S330, the signal strength of the packet is compared with the clear channel assessment threshold to determine whether the secondary channel is busy or idle. For example, when the signal strength is lower than the selected clear channel assessment threshold, the secondary channel is considered idle; and when the signal strength is higher than the selected clear channel assessment threshold, the secondary channel is considered busy. The STA device 130 then operates based on the determined status of the secondary channel. Then the process proceeds to S399 and terminates.

Figure 4:
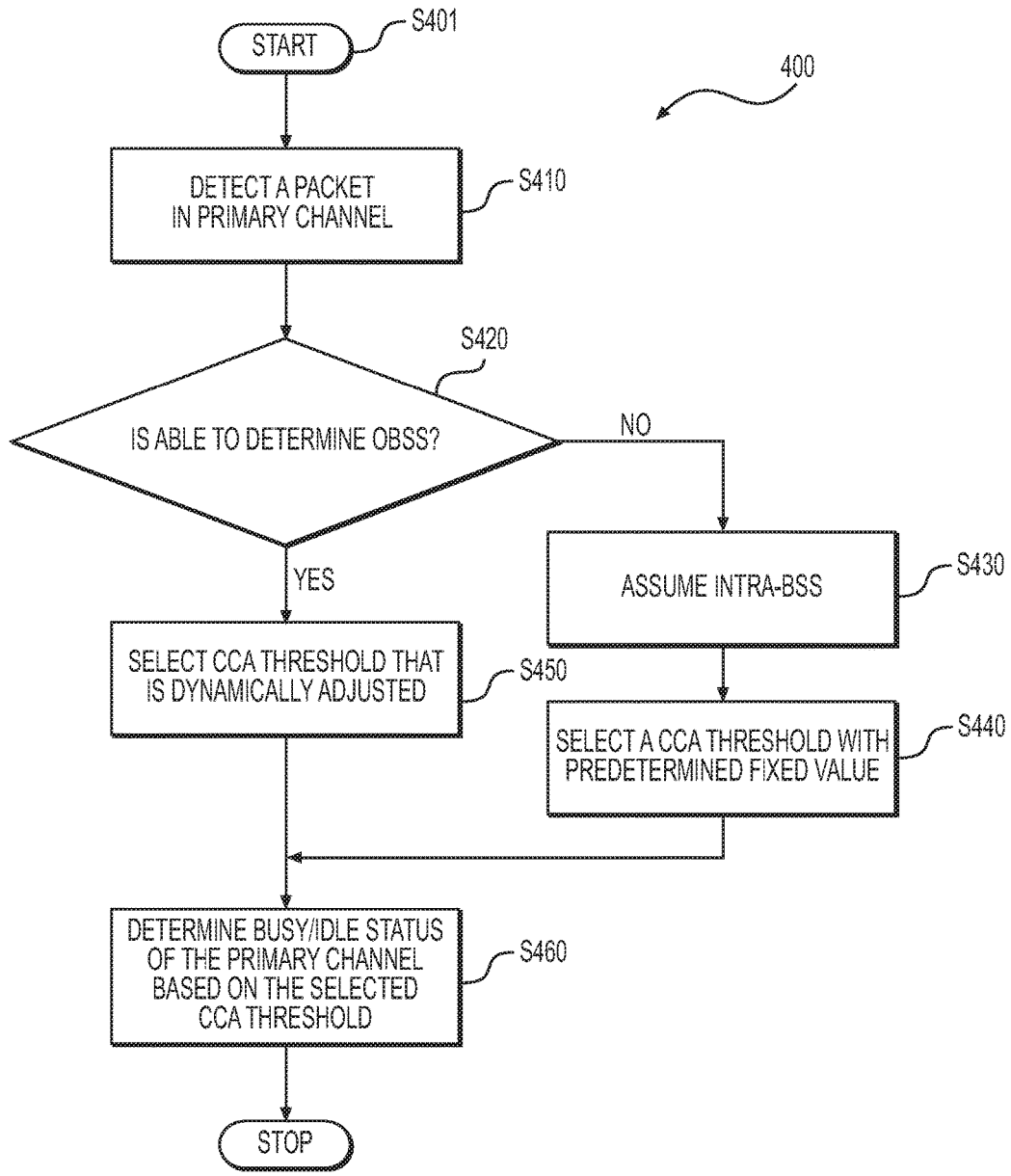
FIG. 4 shows a flow chart outlining a process 400 according to an embodiment of the disclosure.

FIG. 4 shows a flow chart outlining a process 400 according to an embodiment of the disclosure. In an example, the process is executed by the processing circuit 150 of the STA device 130. The process starts at S401, and proceeds to S410.

At S410, a packet is detected in the primary channel. The packet is detected without preamble information. In an example, the decoding of the preamble fails. In another example, the preamble portion is missed by the STA device 130.

At S420, when the processing circuit 150 is able to detect that the packet belongs to an OBSS, the process proceeds to S450; otherwise the process proceeds to S430.

At S430, the packet is assumed to belong to intra-BSS.

At S440, a predetermined clear channel assessment threshold with a fixed value is selected.

At S450, a clear channel assessment threshold that is dynamically adjusted is selected. In an example, the primary channel MPD module 180 selects the proper clear channel assessment threshold based on the second relationship between the clear channel assessment threshold and the transmit power.

At S460, the signal strength of the packet is compared with the selected clear channel assessment threshold to determine busy/idle status of the primary channel. For example, when the signal strength is lower than the selected clear channel assessment threshold, the primary channel is considered idle; and when the signal strength is higher than the selected clear channel assessment threshold, the primary channel is considered busy. The STA device 130 then operates based on the determined status of the secondary channel. Then the process proceeds to S499 and terminates.

Figure 5:
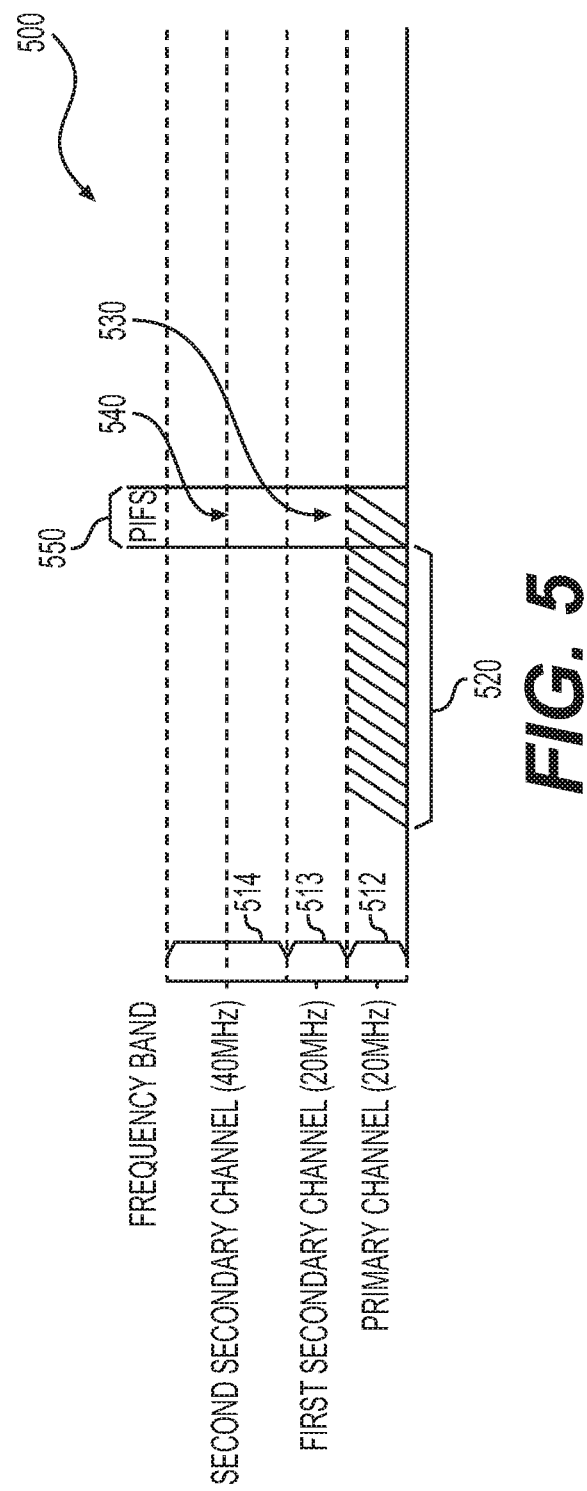
FIGS. 5-8 show plots of clear channel assessment examples according to embodiments of the disclosure.

FIG. 5 shows a plot 500 for clear channel assessment example according to an embodiment of the disclosure. In an example, the STA device 130 performs the clear channel assessment as shown in FIG. 5. The X-axis represents time, and the Y-axis represents frequency. The plot 500 shows a primary channel 512 having 20 MHz bandwidth, a first secondary channel 513 having 20 MHz bandwidth, and a second secondary channel 514 having 40 MHz bandwidth.

In an example, the STA device 130 performs a backoff procedure in the primary channel as shown by 520. For example, the STA device 130 includes a backoff counter. When the primary channel is idle, the backoff counter counts down. In an embodiment, the STA device 130 receives signals for a packet. When the packet is intra-BSS packet, the primary channel is busy, and the backoff counter stops counting down. When the packet is OBSS packet based on preamble information, the STA device 130 selects a clear channel assessment threshold based on the third relationship, and uses the selected clear channel assessment threshold to determine the busy/idle status in the primary channel. For example, when the signal strength of the packet is higher than the selected clear channel assessment threshold, the primary channel is busy, and the backoff counter stops counting down. When the signal strength is lower than the selected clear channel assessment threshold, the primary channel is idle, and the backoff counter continues counting down.

When the backoff counter counts down to zero, the STA device 130 gains access to the primary channel 512. The STA device 130 then determines the busy/idle status of the secondary channels during a point coordination function (PCF) interframe space (PIFS). In an example, when the signal strength in the first secondary channel is higher than the first threshold, the STA device 130 determines that the received signal in the first secondary channel carries a packet, and the STA device 130 is triggered to perform clear channel assessment as shown by 530. In an example, the secondary channel CCA module 170 selects the proper clear channel assessment threshold based on the first relationship between the clear channel assessment threshold and the transmit power. The STA device 130 uses the selected clear channel assessment threshold to determine the busy/idle status of the first secondary channel. For example, when the signal strength of the wireless signal received in the first secondary channel is lower than the selected clear channel assessment threshold, the first secondary channel is considered idle; and when the signal strength is higher than the selected clear channel assessment threshold, the first secondary channel is considered busy. The STA device 130 performs similarly clear channel assessment in the second secondary channel as shown by 540.

In an embodiment, when the first secondary channel 513 is idle during the PIFS period, the STA devise 130 uses resources in the primary channel 512 and the first secondary channel 513 to transmit information. When both the first secondary channel 513 and the second secondary channel 514 are idle, the STA device 130 uses resources in the primary channel 512, the first secondary channel 513 and the second secondary channel 514 to transmit information.

Figure 6:
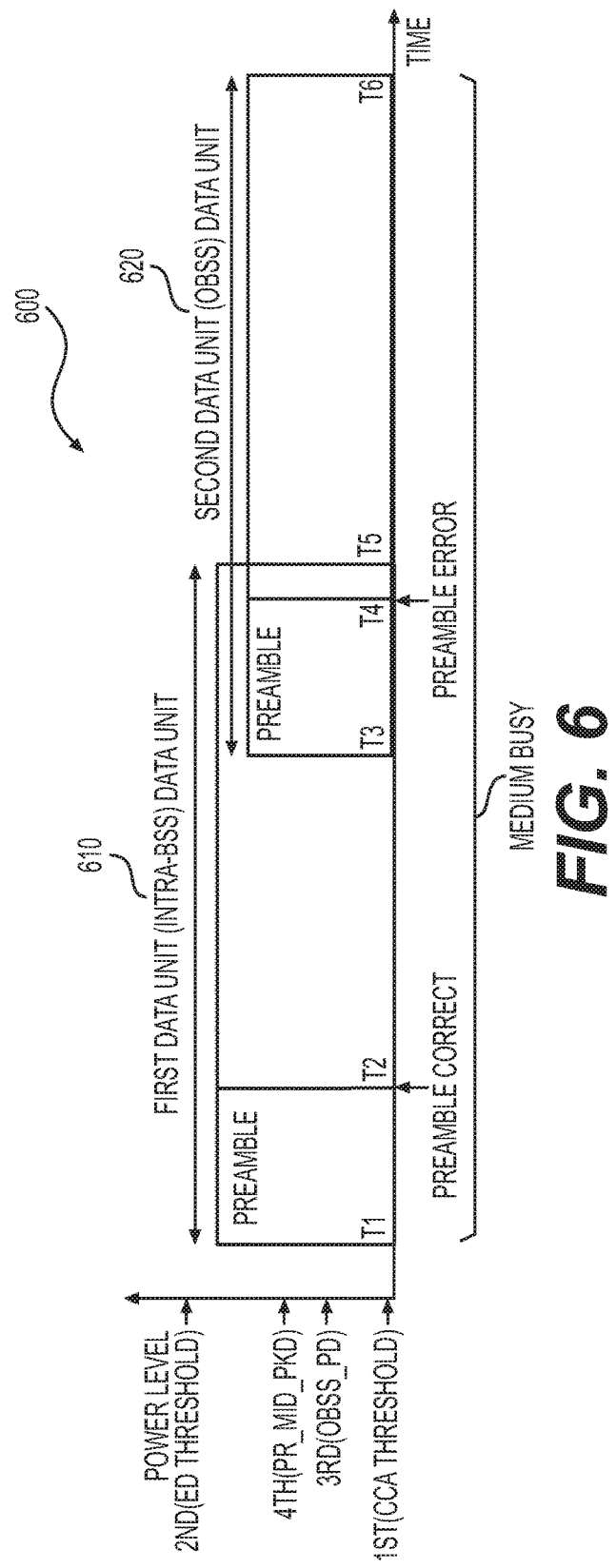

FIG. 6 shows a plot of clear channel assessment example according to embodiment of the disclosure. In an example, the STA device 130 performs the clear channel assessment as shown in FIG. 6. The X-axis represents time, and the Y-axis represents power level. In the FIG. 6 example, the STA device 130 receives wireless signals carrying a first data unit 610 and a second data unit 620, and uses fourth thresholds, $1^{st}$ threshold (CCA threshold), $2^{nd}$ threshold (ED threshold), $3^{rd}$ threshold (OBSS_PD threshold) and $4^{th}$ threshold (PR_MID_PKD) for clear channel assessment.

In an example, $1^{st}$ threshold is used to trigger a clear channel assessment. In an example, $1^{st}$ threshold has a pre-determined value, such as −82 dbm for 20 MHz bandwidth.

In an example, $2^{nd}$ threshold is used to detect interference. The second threshold is set to be high, such as −62 dbm for 20 MHz bandwidth, to lower probability of false alarm of interference detection.

In an example, 3rd threshold (OBSS_PD) is used for clear channel assessment under OBSS situation that is determined based on preamble. In an example, the $3^{rd}$ threshold is determined dynamically based on the third relationship between the clear channel assessment threshold and the transmit power. In an example, the minimum value in the third relationship is −82 dbm, and the maximum value is the third relationship is −62 dbm.

In an example, $4^{th}$ threshold is used for clear channel assessment under OBSS that is determined based on timing violation in an example. In an example, $4^{th}$ threshold is determined based on the second relationship between the clear channel assessment threshold and the transmit power. In an example, the minimum value in the second relationship is −72 dbm, and the maximum value is the third relationship is −62 dbm. In an embodiment, when the processing circuit 150 cannot determine whether the data unit is from an OBSS or is from intra-BSS, the processing circuit 150 selects $4^{th}$ threshold to have a predetermined fixed value, such as −72 dbm for 20 MHz bandwidth.

At t1, the STA device 130 detects wireless signal carrying the first data unit in the primary channel. The wireless signal has a signal strength lower than $2^{nd}$ threshold, but higher than $1^{st}$ threshold. The STA device 130 determines that the wireless signal carries a data unit. The primary channel is considered busy, and CCA is triggered.

At t2, the STA device 130 decodes the preamble. Based on the preamble information, the STA device 130 determines that the wireless signal carries a first data unit that is intra-BSS data unit. For example, the STA device 130 determines that the first data unit is from the STA device 122. The STA device 130 can extract a duration field in the preamble, and considered the primary channel to be busy for that duration.

At t3, the transmission of the second data unit, for example by the STA 115, starts.

At t4, due to the interference of the wireless signals carrying the first data unit and the second data unit, the STA device 130 fails to decode the preamble of the second data unit. In the FIG. 6 example, the STA device 130 considers the second data unit as an intra-BSS, and uses a fixed value for $4^{th}$ threshold for CCA.

At t5, the transmission of the first packet is done. Because the power level of the second data unit is higher than $4^{th}$ threshold, the channel is considered busy until the end of the second data unit.

At t6, the transmission of the second data unit is done.

Figure 7:
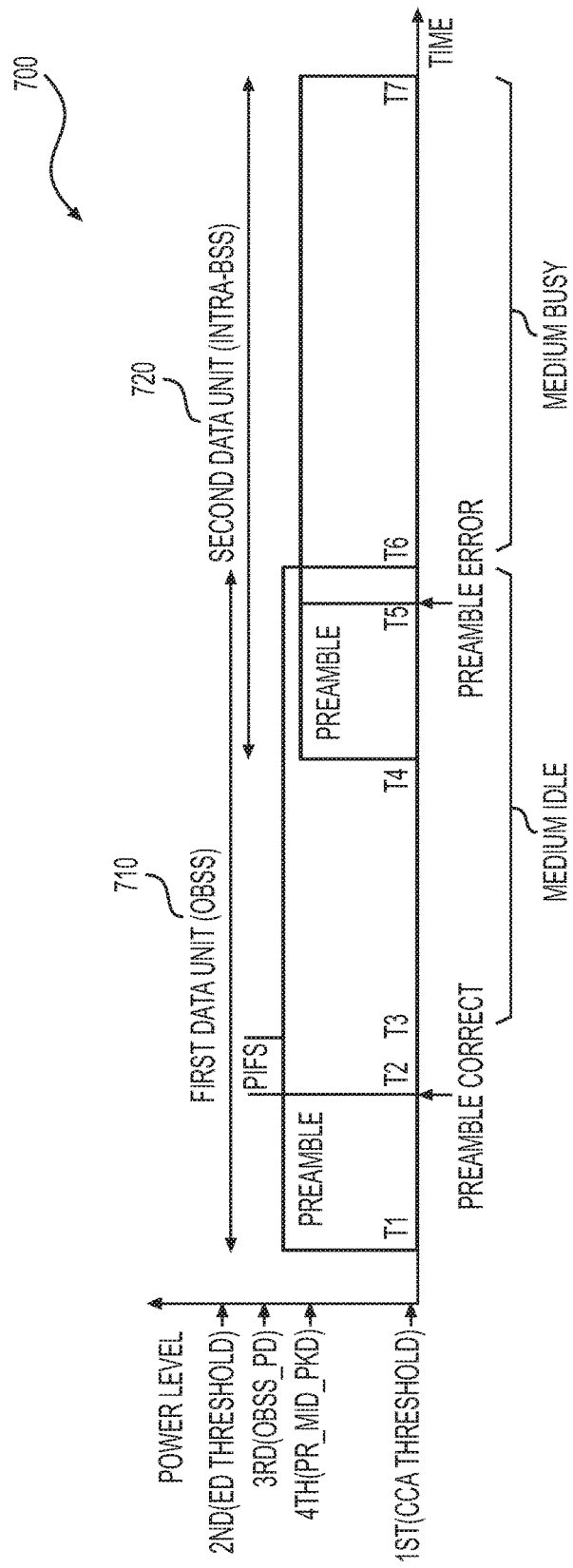

FIG. 7 shows a plot of clear channel assessment example according to embodiment of the disclosure. In an example, the STA device 130 performs the clear channel assessment as shown in FIG. 7. The X-axis represents time, and the Y-axis represents power level. Similar to the FIG. 6 example, the STA device 130 receives wireless signals carrying a first data unit 710 and a second data unit 720, and uses fourth thresholds, $1^{st}$ threshold (CCA threshold), $2^{nd}$ threshold (ED threshold), $3^{rd}$ threshold (OBSS_PD threshold) and $4^{th}$ threshold (PR_MID_PKD) for clear channel assessment.

At t1, the STA device 130 detects wireless signal carrying the first data unit in the primary channel. The wireless signal has a signal strength lower than $2^{nd}$ threshold, but higher than $1^{st}$ threshold. The STA device 130 determines that the wireless signal carries a data unit. The primary channel is considered busy, and CCA is triggered.

At t2, the STA device 130 decodes the preamble of the first data unit. Based on the preamble information, the STA device 130 determines that the wireless signal carries OBSS data unit. For example, the STA device 130 extracts the preamble of the first data unit, and determines that the first data unit is from the STA device 115. Then, the STA device 130 compares the signal strength to the $3^{rd}$ threshold. In the example, the signal strength is lower than the $3^{rd}$ threshold.

At t3, after a PIFS from t2, the signal strength is still lower than the $3^{rd}$ threshold, the STA device 130 considers the primary channel to be idle.

At t4, the transmission of the second data unit, for example by the STA 122, starts.

At t5, due to the interference of the wireless signals carrying the first data unit and the second data unit, the STA device 130 fails to decode the preamble of the second data unit. In the FIG. 7 example, the STA device 130 considers the second data unit as an intra-BSS, and uses a fixed value for $4^{th}$ threshold for CCA.

At t6, the transmission of the first packet finishes. Because the power level of the second data unit is higher than $4^{th}$ threshold, the channel is considered busy until the end of the second data unit.

At t7, the transmission of the second data unit is done.

Figure 8:
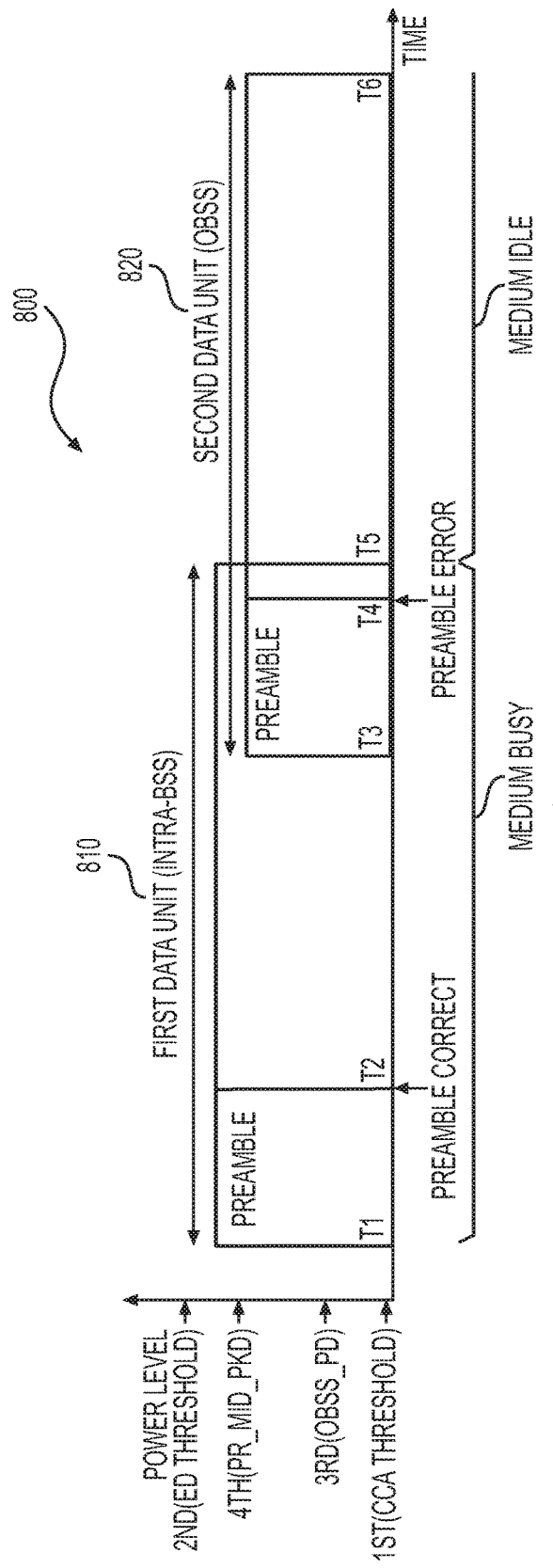

FIG. 8 shows a plot of clear channel assessment example according to embodiment of the disclosure. In an example, the STA device 130 performs the clear channel assessment as shown in FIG. 8. The X-axis represents time, and the Y-axis represents power level. Similar to the FIG. 6 example, the STA device 130 receives wireless signals carrying a first data unit 810 and a second data unit 820, and uses fourth thresholds, $1^{st}$ threshold (CCA threshold), $2^{nd}$ threshold (ED threshold), $3^{rd}$ threshold (OBSS_PD threshold) and $4^{th}$ threshold (PR_MID_PKD) for clear channel assessment.

At t1, the STA device 130 detects wireless signal carrying the first data unit in the primary channel. The wireless signal has a signal strength lower than $2^{nd}$ threshold, but higher than $1^{st}$ threshold. The STA device 130 determines that the wireless signal carries a data unit. The primary channel is considered busy, and CCA is triggered.

At t2, the STA device 130 decodes the preamble. Based on the preamble information, the STA device 130 determines that the wireless signal carries a first data unit that is intra-BSS data unit. For example, the STA device 130 determines that the packet is from the STA device 122. The STA device 130 can extract a duration field in the preamble, and considered the primary channel to be busy for that duration.

At t3, the transmission of the second data unit, for example by the STA 115, starts.

At t4, due to the interference of the wireless signals carrying the first data unit and the second data unit, the STA device 130 fails to decode the preamble of the second data unit. In the FIG. 8 example, the STA device 130 determines that the second data unit does not satisfy timing requirement (e.g., no interframe space) in the second BSS 120, thus the second data unit is OBSS, and $4^{th}$ threshold is selected from a clear channel assessment threshold that is dynamically adjusted according the second relationship. In the FIG. 8 example, $4^{th}$ threshold is adjusted high to encourage spatial and frequency spectral reuse.

At t5, the transmission of the first packet is done. Because the power level of the second data unit is lower than $4^{th}$ threshold, the channel is considered idle until the end of the second data unit.

At t6, the transmission of the second data unit is done.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for wireless communication, the apparatus comprising:
   a transceiver configured to receive signals and transmit signals in one or more channels; and
   a processing circuit configured to:
   detect that the received signals in a channel carry a data unit;
   determine that the data unit belongs to an overlapping basic service set (OBSS) that overlaps with a basic service set (BSS) that the apparatus belongs to without information in a preamble of the data unit when the data unit violates a time requirement in the channel that is a primary channel of another BSS:
   select a clear channel assessment threshold that is dynamically adjusted for a spatial re-use when the data unit is determined to belong to the OBSS; and
   compare a signal strength of the received signals carrying the data unit with the selected clear channel assessment threshold to determine a busy/idle status of the channel.

2. The apparatus of claim 1, wherein the processing circuit is configured to determine that the data unit belongs to the OBSS when the channel is a secondary channel.

3. The apparatus of claim 1, wherein the processing circuit is configured to select the clear channel assessment threshold having a predetermined fixed value when the determination that the data unit belongs to the OBSS cannot be made.

4. The apparatus of claim 1, wherein the clear channel assessment threshold is adjusted between a maximum value and a minimum value with a linear relationship to a transmit power of a transmitting circuit.

5. The apparatus of claim 1, wherein the clear channel assessment threshold is a function of a bandwidth of the channel.

6. A method of wireless communication, the method comprising:
   detecting, by a processing circuit in a device, received signals in a channel carrying a data unit;
   determining that the data unit belongs to an overlapping basic service set (OBSS) that overlaps with a basic service set (BSS) that the device belongs to without information in a preamble of the data unit when the data unit violates a time requirement in the channel that is a primary channel of another BSS;

selecting a clear channel assessment threshold that is dynamically adjusted for a spatial re-use when the data unit is determined to belong to the OBSS; and comparing a signal strength of the received signals carrying the data unit with the selected clear channel assessment threshold to determine a busy/idle status of the channel.

7. The method of claim 6, wherein the determining that the data unit belongs to the OBSS that overlaps with the BSS that the device belongs to without information in the preamble of the data unit further comprises:

determining that the data unit belongs to the OBSS when the channel is a secondary channel.

8. The method of claim 6, further comprising:

selecting the clear channel assessment threshold having a predetermined fixed value when the determination that the data unit belongs to the OBSS cannot be made.

9. The method of claim 6, wherein the clear channel assessment threshold is adjusted between a maximum value and a minimum value with a linear relationship to a transmit power of a transmitting circuit.

10. The method of claim 6, wherein the clear channel assessment threshold is a function of a bandwidth of the channel.

11. A non-transitory computer readable medium storing program instructions for causing a processor to execute operations for a wireless communication, the operations comprising:

detecting, by a device, received signals in a channel carrying a data unit;

determining that the data unit belongs to an overlapping basic service set (OBSS) that overlaps with a basic service set (BSS) that the device belongs to without information in a preamble of the data unit when the data unit violates a time requirement in the channel that is a primary channel of another BSS;

selecting a clear channel assessment threshold that is dynamically adjusted for a spatial re-use when the data unit is determined to belong to the OBSS; and comparing a signal strength of the received signals carrying the data unit with the selected clear channel assessment threshold to determine a busy/idle status of the channel.

12. The non-transitory computer readable medium of claim 11, wherein the determining that the data unit belongs to the OBSS that overlaps with the BSS that the device belongs to without information in the preamble of the data unit further comprises:

determining that the data unit belongs to the OBSS when the channel is a secondary channel.

13. The non-transitory computer readable medium of claim 11, the operations further comprising:

selecting the clear channel assessment threshold having a predetermined fixed value when the determination that the data unit belongs to the OBSS cannot be made.

14. The non-transitory computer readable medium of claim 11, wherein the clear channel assessment threshold is adjusted between a maximum value and a minimum value with a linear relationship to a transmit power of a transmitting circuit.

15. The non-transitory computer readable medium of claim 11, wherein the clear channel assessment threshold is a function of a bandwidth of the channel.

* * * * *